(12) United States Patent
Gottwals et al.

(10) Patent No.: US 8,872,923 B2
(45) Date of Patent: Oct. 28, 2014

(54) COLOR CALIBRATION CHART ACQUISITION

(71) Applicant: Hewlett-Packard Development Company, LLP, Houston, TX (US)

(72) Inventors: Melanie M. Gottwals, Palo Alto, CA (US); Ehud Chatow, Palo Alto, CA (US); Nathan Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/772,294

(22) Filed: Feb. 20, 2013

(65) Prior Publication Data

US 2014/0232879 A1 Aug. 21, 2014

(51) Int. Cl.
*H04N 17/00* (2006.01)
*H04N 17/02* (2006.01)
*G06K 9/00* (2006.01)

(52) U.S. Cl.
CPC .................................. *H04N 17/002* (2013.01)
USPC ........... 348/188; 348/175; 348/176; 348/179; 348/180; 382/165

(58) Field of Classification Search
USPC ......... 348/222, 175, 176, 177, 178, 179, 180, 348/188; 382/165
See application file for complete search history.

(56) References Cited

U.S. PATENT DOCUMENTS

| | | | |
|---|---|---|---|
| 5,773,810 A * | 6/1998 | Hussey et al. ............ | 235/462.25 |
| 5,852,675 A | 12/1998 | Matsuo et al. | |
| 6,008,836 A * | 12/1999 | Bruck et al. .................. | 725/131 |
| 6,078,309 A * | 6/2000 | Chen et al. ..................... | 345/589 |
| 6,768,814 B1 | 7/2004 | Spitzer et al. | |
| 7,262,779 B1 | 8/2007 | Sones | |
| 7,489,336 B2 * | 2/2009 | Lim .............................. | 348/181 |
| 7,522,767 B2 * | 4/2009 | Baker et al. ................... | 382/167 |
| 7,522,769 B2 | 4/2009 | Harville et al. | |
| 7,599,091 B2 * | 10/2009 | Kondo et al. ................... | 358/1.9 |
| 7,626,589 B2 * | 12/2009 | Berger .......................... | 345/582 |
| 7,679,786 B2 | 3/2010 | Scott et al. | |
| 7,733,353 B2 * | 6/2010 | Edge ............................. | 345/589 |
| RE42,089 E * | 2/2011 | Holmes .......................... | 348/179 |
| 7,969,426 B2 * | 6/2011 | Skillman et al. .............. | 345/175 |
| 8,059,183 B2 | 11/2011 | Seto | |
| 8,073,248 B2 | 12/2011 | Brunner et al. | |
| 8,229,210 B2 | 7/2012 | Rao | |
| 8,284,260 B2 | 10/2012 | Wang et al. | |
| 8,532,372 B2 * | 9/2013 | Youngman et al. ........... | 382/162 |
| 2002/0122589 A1 * | 9/2002 | Reiman et al. ................ | 382/167 |
| 2004/0201726 A1 * | 10/2004 | Bloom et al. .............. | 348/223.1 |
| 2008/0304741 A1 * | 12/2008 | Brunner et al. .............. | 382/168 |
| 2011/0157180 A1 * | 6/2011 | Burger et al. ................. | 345/428 |
| 2012/0076405 A1 * | 3/2012 | Brunner et al. .............. | 382/167 |
| 2012/0099788 A1 * | 4/2012 | Bhatti et al. ................... | 382/167 |
| 2012/0294517 A1 | 11/2012 | Lings et al. | |
| 2013/0154903 A1 * | 6/2013 | Kim .............................. | 345/1.1 |
| 2013/0235398 A1 * | 9/2013 | Bhatti et al. .................... | 358/1.9 |

* cited by examiner

*Primary Examiner* — Brian Yenke

(57) ABSTRACT

The present disclosure relates to color calibration chart acquisition. In an example, a video acquired by an imaging device may be processed. The video may be analyzed to automatically detect a reproduction of a color calibration chart. Upon detection of a reproduction of the color calibration chart, it may be determined whether color calibration chart reproduction quality is within a selected quality threshold. Upon determining that color calibration chart reproduction quality is not within a selected threshold, user feedback may be provided, via the imaging device, to dynamically guide the user to make adjustments in the video acquisition in order to obtain a color calibration chart reproduction within the selected quality threshold.

15 Claims, 6 Drawing Sheets

COLOR CALIBRATION CHART ACQUISITION

BACKGROUND

There are a variety of situations where accurate color reproduction in digital imaging is desired. For example, many companies demand that their corporate identities, things such as logos and product advertising have a consistent look and color, no matter where the actual printing or display occurs. Other examples include taking digital images of products for advertising. If the color in the images is not an accurate representation of the color of the product, the consumers are not able to make informed purchasing decisions.

To facilitate color reproduction, a color calibration chart (hereinafter referred to as "color chart") may be used. A color chart may be constituted as a flat, physical object colored with an arrangement of standardized color samples.

An adequate reproduction of a color chart may be captured and color profiling may be performed based on the captured reproduction of the color chart. For example, a color chart may include known color attributes that can be used to measure colors in an image. Further, color charts may be used to color calibrate and/or generate color profiles of digital input devices such as digital cameras or scanners and output display systems like printers, monitors and projectors as well as for color correction of an acquired image.

BRIEF DESCRIPTION OF THE DRAWINGS

In order that the present disclosure may be well understood, various examples will now be described with reference to the following drawings.

DETAILED DESCRIPTION

Figure 1:
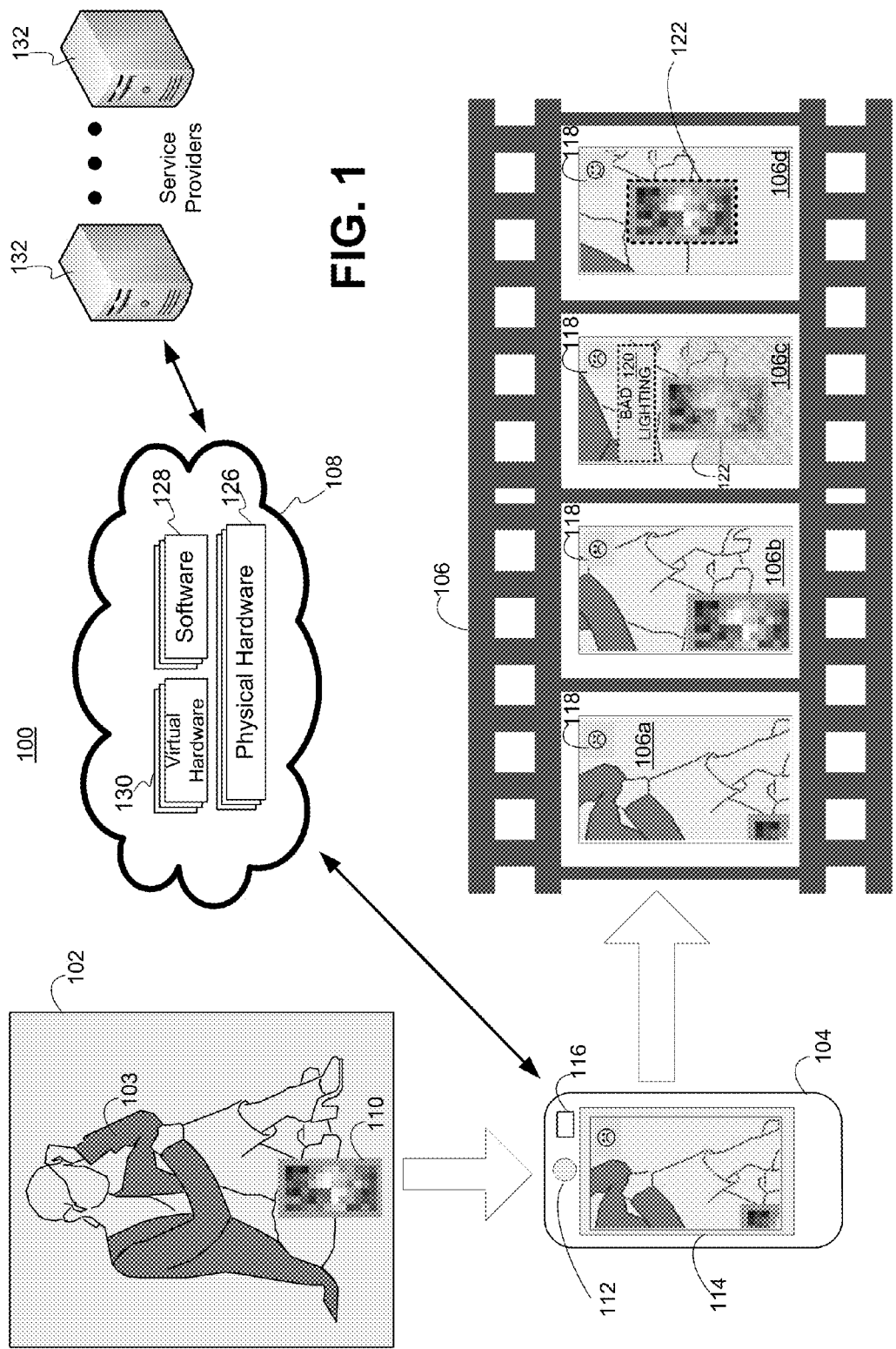
FIG. 1 is an environment in which examples can be implemented.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. While a limited number of examples are illustrated, it will be understood that there are numerous modifications and variations therefrom. Similar or equal elements in the Figures may be indicated using the same numeral.

As discussed above, a color chart may be used for color profiling. A color chart is intended to encompass any suitable chart substrate comprised of a set of colors selected to enable generation of a color profile. Such a color profile can be used, for example, for color calibration of a device or color correction or estimation from an image. A color chart may be constituted as a flat, physical object colored with an arrangement of standardized color samples (e.g., a plurality of color patches). A color chart may also include a uniform frame for facilitating automatic detection thereof as set forth below. Color charts, such as the X-Rite color checker, may be rectangular and have a selected size and color patch layout.

For color chart capturing, an image of a color chart might be acquired by an imaging device. As used herein, capture of a color chart refers to the collection of data that reproduces an image of a color chart. This collected data may be used as basis for color profiling. A color chart capture may be based on a single acquisition of a color chart or on a plurality of acquisitions that are conjugated for reproducing the color chart. For example, a plurality of color chart acquisitions may be averaged to enhance capturing of color chart reproduction.

From the captured color chart reproduction, a color profile might be generated. For example, a color profile might be generated in the form of a look-up table relating (i) colors actually being acquired by the imaging device to (ii) corresponding true colors. Other types of color profiling might be performed, such as color correction of colors in an image, conveying a true color of a sample, or determining variance from an acquired color to a target color based on the acquired color chart.

For performing color profiling with an acceptable quality, it might be required that an image of the color chart is captured with a specific quality. In other words, it might be required that a color chart is captured with a certain level of quality in order to be usable for color profiling. If the color chart is not appropriately captured, the color profiling accuracy may degrade. Moreover, low quality acquisition of a color chart may even make it impossible to perform color profiling.

Some applications for color profiling are based on processing images of a color chart acquired from a camera. However, such applications cannot give a user real-time information on quality of the color chart acquisition. That is, in such application, a user might infer that a color chart was not appropriately captured after color profiling is performed. In such cases, the user might be obliged to repeat the whole chart capture process, which may make color profiling a cumbersome procedure.

Some procedures have been proposed elsewhere to streamline appropriate capturing of a color chart. In one of such procedures the following steps have been proposed:
(i) when a subject is acquired for temporary display, displaying the subject in a field of a viewfinder,
(ii) determining whether or not the subject can be captured as a chart having a plurality of color patches which enable to generate a color profile,
(iii) capturing the subject as the chart when determined in the determining step that the subject can be captured as the chart, and
(iv) notifying that the subject cannot be captured as the chart when determined in the determining step that the subject cannot be captured as the chart.

However, in such a proposed realization of color chart capture, the determination step is triggered by a temporary acquisition of a subject (e.g., performing a photograph by actuating the shutter of a camera). Thereby, the user obtains feedback on the quality of the color chart acquisition based on a still image of a subject. Although the user might obtain information on whether color chart acquisition is appropriate immediately after subject acquisition, user experience might be poor since it is based on a discontinuous procedure. Moreover, such a procedure offers rather poor user guidance for acquiring a color chart with a sufficient quality.

At least some of the principles described below solve the above challenges by (i) processing a video acquired by an imaging device; (ii) analyzing the video to automatically detect a reproduction of a color calibration chart; (iii) upon detection of a reproduction of the color calibration chart, determining whether color calibration chart reproduction quality is within a selected quality threshold; and (iv) upon determining that color calibration chart reproduction quality is not within a selected threshold, providing user feedback, via the imaging device, to dynamically guide the user to make adjustments in the video acquisition in order to obtain a color calibration chart reproduction within the selected quality threshold.

Thereby, it is facilitated a realization of color chart acquisition that provides a simple and easy interface which automatically finds a color chart in a video while interacting with the user to improve color chart capture accuracy. Further, at least some of the examples herein facilitate color chart capture accuracy with non-professional imaging devices (e.g., smartphones or tablets) being operated by non-experts. It will be understood that examples herein are not limited to non-professional equipment and/or non-experts.

As an example, an imaging device, such as a smart phone equipped with a camera, can be used to acquire and process a video. These images can be acquired using the phone camera during a video acquisition session. The video acquisition session can be monitored by continually processing video frames to automatically detect a color chart in an acquired scene. Based on the results of the monitoring, or "color chart detection", a user might be guided via UI events on (i) whether a color chart is being detected, and (ii) the quality of the captured color chart. Such an example is illustrated in the following with respect to FIG. 1.

FIG. 1 shows an environment 100 in which examples can be implemented. Environment 100 shows a scene 102 including a color chart 110, a mobile imaging device 104, a video stream 106, a cloud 108, and service providers 132.

Mobile imaging device 104 is configured to acquire a video, such as the video contained in video stream 106. In the illustrated example, imaging device 104 includes a camera 112 and display 114 to display video stream 106. An imaging device as used herein, e.g. device 104, might be a dedicated digital imaging camera such as a compact digital camera or an interchangeable lens digital camera or a wearable camera. Further, an imaging device as used herein might be a device dedicated to color profiling. In other examples, an imaging device as used herein might be a multi-use device with advanced computing capabilities such as a smartphone, a tablet, or an interactive TV equipped with a camera.

Device 104 may include a flash 116 to facilitate suitable illumination of color chart 110 by producing a flash of light at the time a video of color chart 110 is being acquired. For example, flash 116 may be constituted of a LED. In the illustrated example, camera 112 and flash 116 are shown located at the same side than display 114 (e.g., a front side of a smartphone). Camera 112 and flash 116 may be provided at other suitable locations of mobile imaging device 104 such as the side opposite to display 114 (e.g., a rear side of a smartphone or a tablet). Imaging device 104 may include more than one camera and flash. For examples, imaging device 104 might include cameras and flashes at both a rear side and a front side.

Mobile imaging device 104 may provide a color chart acquisition mode in which it is configured to start acquiring a video and guide a user to acquire the color chart as described herein. Such a color chart acquisition mode may be selectable by a user via, for example, a GUI element (not shown) displayed by display 114 or a dedicated hardware selector (not shown) at the device (i.e., a dedicated button). Activation of a color chart acquisition mode may be indicated to a user via a label (not shown) in display 114.

Mobile imaging device 104 may be configured to communicate with cloud 108 via a network (not shown) such as the internet or any other suitable network. For example, mobile imaging device 104 may transmit data related to an image acquired via camera 112 so that color profiling, or any other service related to color processing, might be performed via cloud 108. Device 104 may receive data from cloud 108 including results of a color profiling, or any other service related to color processing.

Cloud 108 is a computing system including multiple pieces of hardware operatively coupled over a network so that they can perform a specific computing task and, more specifically, deliver services to mobile imaging device 104. Cloud 108 includes a combination of physical hardware 126, software 128, and virtual hardware 130. Cloud 108 is configured to (i) receive requests and/or data from mobile imaging device 104, and (ii) return request responses and/or data to mobile imaging device 104 for implementing specific services related to color processing as described above. By way of example, cloud 108 may be a private cloud, a public cloud or a hybrid cloud. Further, cloud 108 may be a combination of cloud computing systems including a private cloud (or multiple private clouds) and a public cloud (or multiple public clouds).

Physical hardware 126 may include, among others, processors, memory devices, and networking equipment. Virtual hardware 130 is a type of software that is processed by physical hardware 126 and designed to emulate specific software. For example, virtual hardware 130 may include a virtual machine (VM), i.e. a software implementation of a computer that supports execution of an application like a physical machine. An application, as used herein, refers to a set of specific instructions executable by a computing system for facilitating carrying out a specific task. For example, an application may take the form of a web-based tool providing users with color profiling capabilities based on an image acquired by mobile imaging device 104. Software 128 is a set of instructions and data configured to cause virtual hardware 130 to execute an application for providing a color processing service to mobile imaging device 104. Thereby, cloud 108 can make applications related to color profiling, or any other type of service, available to mobile imaging device 104.

Service provider systems 132 represent on-premise systems of service providers that may provide a service to a user of mobile imaging device 104 via cloud 108. Such services may be based on color profiling. For example, service provider systems 132 may be operated by print service providers (PSPs).

Environment 100 facilitates color calibrated communication between the user of device 104 and service provider systems 132. For example, device 104 might be used to simultaneously acquire color chart 110 and a color sample in scene 102, for example a color of a jacket 103. From the image, a calibrated ("true") color request can be sent via cloud 108 to one or more of the PSPs operating service provider systems 132. The PSPs may then formulate an offer based on the calibrated color request. For example, they might communicate how accurately can they reproduce the calibrated color request and/or communicate associated pricing.

Color profiling may be performed by using embedded color chart 110 to generate a color correction function that eliminates a discrepancy between colors measured via imaging device 104 and known colors in color chart 110. Obtaining such a color correction function is described in, for example, U.S. Pat. No. 7,522,767, which is incorporated herein by reference in its entirety (to the extent in which this document is not inconsistent with the present disclosure) and in particular those parts thereof describing conveying true color of a sample.

It will be understood that environment 100 is merely an example and that other environments for implementing examples are foreseen. For example, but not limited thereto, functionality for color profiling may be completely implemented on premises of an imaging device (e.g., mobile imaging device 104). Thereby, the imaging device might be operated independently from a remote computing system (e.g., cloud 108) for implementing functionality described herein.

As set forth above, for color profiling, it is advantageous properly capturing a reproduction of color chart 110. FIG. 1 illustrates an example of how a user might be guided to acquire a reproduction of color chart 110. In particular, FIG. 1 shows video stream 106 including frames 106a-106d as displayed by display 114 during video acquisition of color chart 110. Frames 106a-106d include instantaneous images of a video being acquired via camera 112 as well as user interface (UI) event(s) for guiding the user to acquire color chart 110. In the illustrated examples, UI events are shown as a smiley 118, a text interface 120 for displaying a text message, and an overlay 122. In frames 106a-106c, smiley 118 indicates that acquisition of color chart 110 is not satisfying (e.g., because a color calibration chart reproduction cannot be captured within a selected quality threshold). At frame 106c, text interface 120 displays a message indicating a specific reason as to why acquisition of color chart 110 is not satisfying, namely (for this specific example) because bad illumination of color chart 110 caused by a shadow 122 being cast over the color chart. In frame 106d, smiley 118 indicates that acquisition of color chart 110 is satisfying (e.g., because a color calibration chart reproduction can be captured within a selected quality threshold). Further, in frame 106d, overlay 122 is displayed around the reproduction of color chart 110 to indicate to the user accomplishment of a color chart capture that is usable for color profiling.

It will be understood that the UI events shown in FIG. 1 are merely illustrative and that other suitable UI events may be used for displaying user feedback to dynamically guide the user to capture color chart 110 as set forth below.

Further, whether or not acquisition of color chart 110 is satisfying can be automatically determined by determining quality of a color chart reproduction. As used herein, quality of a color chart reproduction refers to a characteristic of the imaged color chart that potentially affects color profiling based on the color chart reproduction. Factors that might impact quality of a color chart include, for example, the following: (i) oblique acquisition of a color chart, which might render extraction of color patch data difficult; (ii) noise arising from insufficient illumination of the color chart during video acquisition; (iii) inappropriate acquisition parameters such as focus distance or exposure, (iv) inappropriate illumination of the color chart during acquisition (e.g., non-uniform illumination), or (v) light reflections in portions of the color chart.

Reproduction quality might be determined by analyzing the results of the color chart detection and, more specifically, by (i) analyzing the video acquired via camera 112 to automatically detect a reproduction of color chart 110, and (ii) determining whether color calibration chart reproduction quality is within a selected quality threshold. Such an automatic determination is illustrated in more detail below with respect to FIG. 5.

Figure 2:
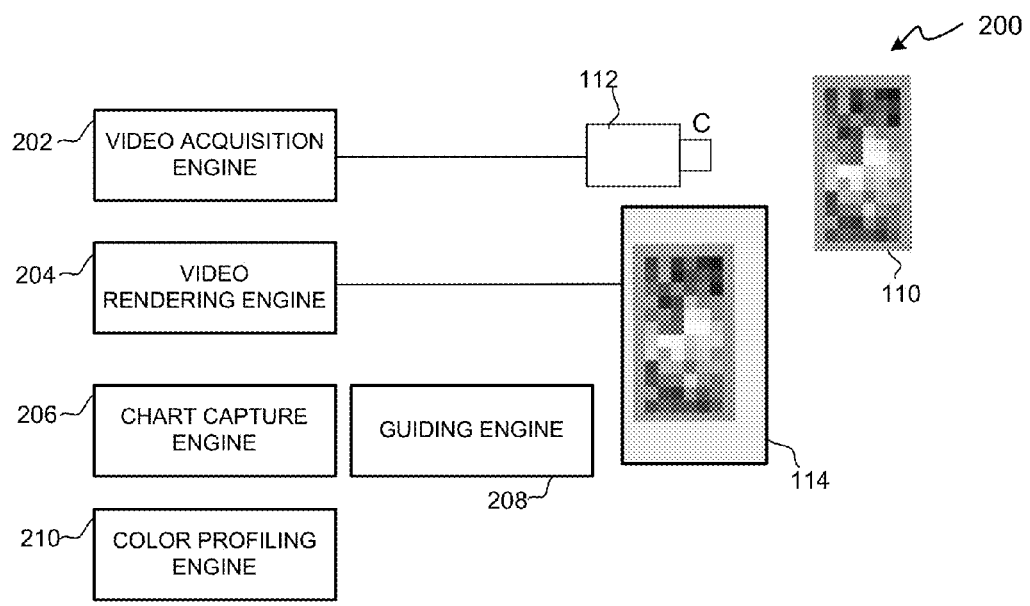
FIG. 2 is a block representation of elements of a system for implementing examples.

FIG. 2 shows a schematic representation of an imaging device 200 for implementing examples. Device 200 includes a camera 112 and a display 114 to display a video stream (e.g., video stream 106 shown in FIG. 1). FIG. 2 also depicts physical and logical components of device 200 for implementing various examples of functionality. More specifically, imaging device 200 is shown to include a video acquisition engine 202, a video rendering engine 204, and a chart capture engine 206. In examples, device 200 may further include a guiding engine 208 and a color profiling engine 210. For illustrating elements shown in FIG. 2, reference is made to the example environment in FIG. 1. However, it will be understood that elements in FIG. 2 are not limited by the example of FIG. 1 and they might be operated in other environments (e.g., with a stand-alone imaging device implementing examples herein without interaction with a cloud).

Camera 112 may be constituted by any digital acquisition arrangement suitable to acquire a video sequence including a reproduction of color chart 110. For example, camera 112 may be constituted by a CCD sensor (not shown) operatively coupled to driving circuitry (not shown) and optics suitable to perform video acquisition of color chart 110. It will be understood that there are a variety of manners for implementing video acquisition via camera 112.

Display 114 may be constituted by any digital display arrangement suitable to display a video stream including a reproduction of color chart 110 as well as UI events as described herein for guiding a user in the acquisition of a color chart. For example, display 114 may be constituted by a flat panel display (e.g., an LCD display) operatively coupled to suitable driving circuitry (not shown). In examples, display 114 may be a touchscreen to operate device 112 thereby facilitating usability.

Video acquisition engine 202 represents, generally, any combination of hardware and programming configured to acquire a video via camera 112. For example, acquisition engine 202 may cause camera 112 to acquire successive images of color chart 110 (e.g., image 104 in FIG. 1) at selected time intervals that constitute frames of the video. Alternatively, or additionally thereto, acquisition engine 202 may communicate, directly or indirectly, with camera 112 to obtain acquired digital video data including data reproducing color chart 110. In examples, video acquisition engine 202 may include more specific features such as automatic detection of color chart 110. Examples on automatic detection of color chart 110 are set forth below with respect to FIG. 6.

Video rendering engine 204 represents, generally, any combination of hardware and programming configured to operate display 114 to display a video stream based on a video acquired via camera 112. In an example, video acquisition engine 204 is to operate display 114 to render video stream 106 (shown in FIG. 1) including a representation of color chart 110. In examples, video rendering engine 204 may collaborate with guiding engine 208 for rendering UI events (e.g., smiley 118 or text interface 120, shown in FIG. 1) that facilitate guiding a user to capture color chart 110 within a selected quality threshold, as described herein.

Chart capture engine 206 represents, generally, any combination of hardware and programming configured to automatically capture a reproduction of color chart 110 from the video acquired via the display. As used herein, capturing a color chart reproduction refers to generation of digital data that represents a reproduction of a color chart and is usable for performing color profiling. Such a capture might correspond to a direct acquisition of the color chart as reproduced in a video frame. In other examples, such a capture is generated by processing multiple acquisitions of a color chart as set forth in more detail below.

In examples herein, chart capture engine 206 may continuously process a video acquired via camera 112 to (i) automatically detect a reproduction of color chart 110 in a video frame and (ii) upon detecting a reproduction of color chart 110 in the video, determining whether color chart 110 can be captured within a selected quality threshold using at least one frame of the video. (Examples of items (i) and (ii) are set forth below with respect to FIG. 5). As used herein, continuous processing of a video does not necessarily imply processing all frames of a video during a specific time period. Continuous processing of a video may be realized by processing interleaved frames, e.g., processing frames separated by certain time intervals, processing frames separated by selected number of successive frames, or processing frames once computing resources are available.

Guiding engine 208 represents, generally, any combination of hardware and programming configured to provide user feedback on quality of detected color calibration chart reproductions. For example, guiding engine 208 may process quality determinations performed by chart capture engine 206 and, based thereon, cause UI events provided to guide a user, via display 114, to obtain an appropriate reproduction of color chart 110. Some examples of such UI event are illustrated above with respect to FIG. 1 (see smiley 118 and text interface 120).

Color profiling engine 210 represents, generally, any combination of hardware and programming configured to perform a color profile based on a reproduction of color chart 110, which reproduction might be captured by chart capture engine 206. It will be understood that there are a variety of methods available for performing color profiling. For example, color profiling engine 210 may be to estimate true colors of a sample image based on the captured color chart as described above.

Further, color profiling engine 210 may be to color calibrate an imaging device based on the acquired color chart. Color calibration may include measuring and/or adjusting its color response to a known state. More specifically, color calibration might establish a known relationship to a standard color space. For color calibration, a reproduction of color chart 110 acquired by the imaging device may be converted to color values. A correction profile can then be built using the difference between these color values and the known reference values corresponding to the set of colors in color chart 110.

It will be understood that the set of engines shown in FIG. 2 as part of imaging device 200 is merely illustrative and different configurations of the engines are foreseen. For example, referring to the environment of FIG. 1, mobile imaging device 104 may implement video acquisition engine 202, video rendering engine 204, chart capture engine 206, and guiding engine 210. Color profiling engine 210 may be implemented by cloud 108 so that mobile imaging device 104 access color profiling capabilities via cloud 108. In other examples, the set of engines in FIG. 2 are implemented on the premises of an imaging device (e.g., mobile imaging device 104) so that it can independently implement functionality described herein.

Figure 3:
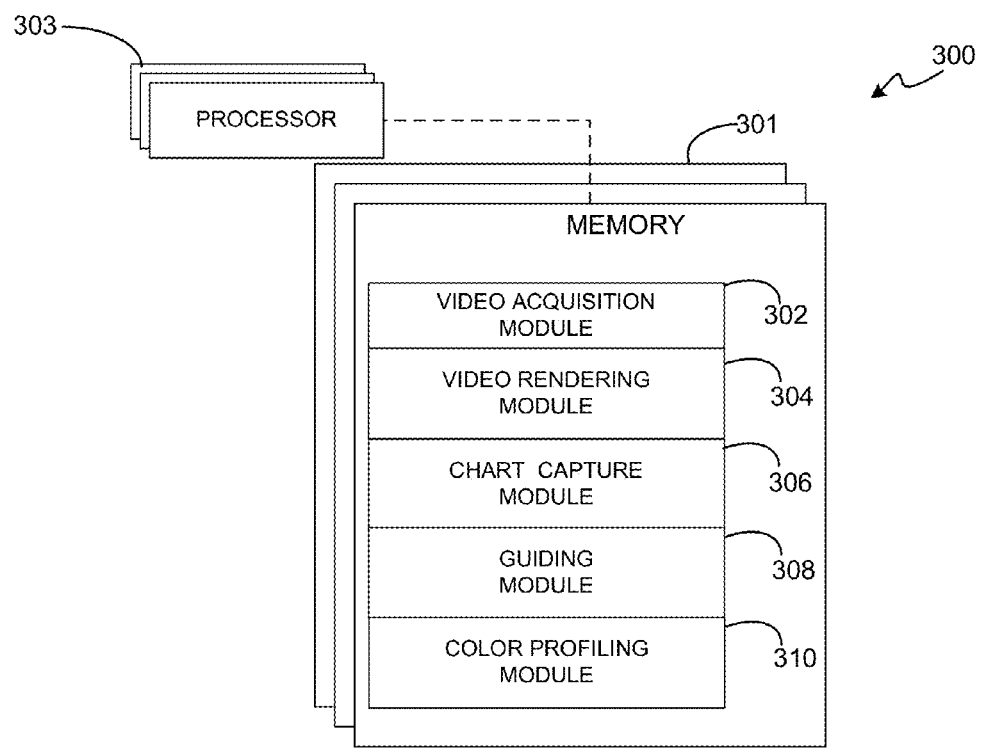
FIG. 3 is a block representation of physical and logical components for implementing various examples.

In foregoing discussion, various components were described as combinations of hardware and programming. Such components may be implemented in a number of fashions. Referring to FIG. 3 the programming may be processor executable instructions stored on tangible memory media 301 and the hardware may include a processor 303 for executing those instructions. Memory 301 can be said to store program instructions that when executed by processor 303 implement a system 300 comprising the set of engines illustrated in FIG. 2. Memory 301 may be integrated in the same device as processor 303 or it may be separate but accessible to that device and processor 303. Processor 303 may be implemented in mobile computing device 104 or in a remote computing system operatively connected thereto such as cloud 108.

In one example, the program instructions can be part of an installation package that can be executed by processor 303 to implement system 300. In such case, memory 301 may be a portable medium such as a CD, DVD, or flash drive or a memory maintained by a server from which the installation package can be downloaded and installed. In another example, the program instructions may be part of an application or applications already installed. Here, memory 301 can include integrated memory such as a hard drive.

In FIG. 3, the executable program instructions stored in memory 301 are depicted as a video acquisition module 302, a video rendering module 304, a chart capture module 206, a guiding module 308, and a color profiling module 310.

Video acquisition module 302 represents program instructions that when executed cause the implementation of video acquisition engine 202 of FIG. 2. Likewise, video rendering module 304 represents program instructions that when executed cause the implementation of video rendering engine 204 of FIG. 2. Likewise, chart capture module 206 represents program instructions that when executed cause the implementation of chart capture engine 206 of FIG. 2. Likewise, guiding module 308 represents program instructions that when executed cause the implementation of guiding engine 208 of FIG. 2. Likewise, color profiling module 310 represents program instructions that when executed cause the implementation of color profiling engine 210 of FIG. 2.

Figure 4:
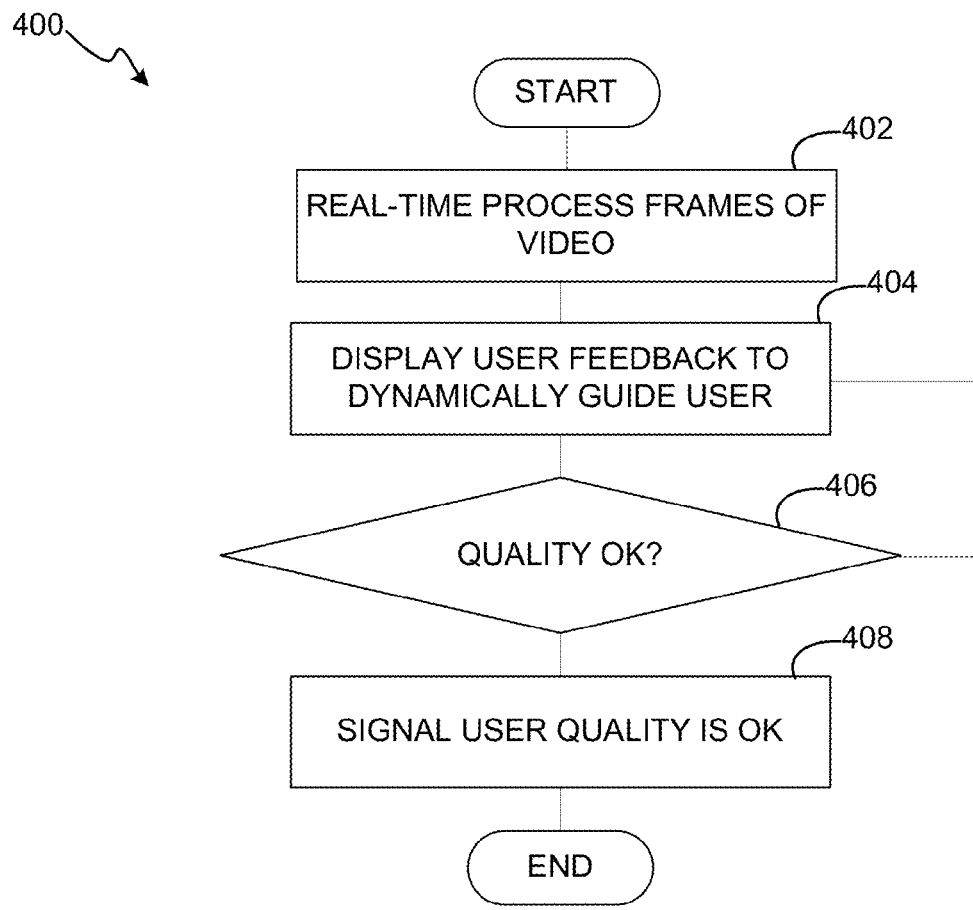
FIG. 4 is a flowchart for implementing methods to guide a user acquiring a reproduction of a color calibration chart according to examples herein.
Figure 5:
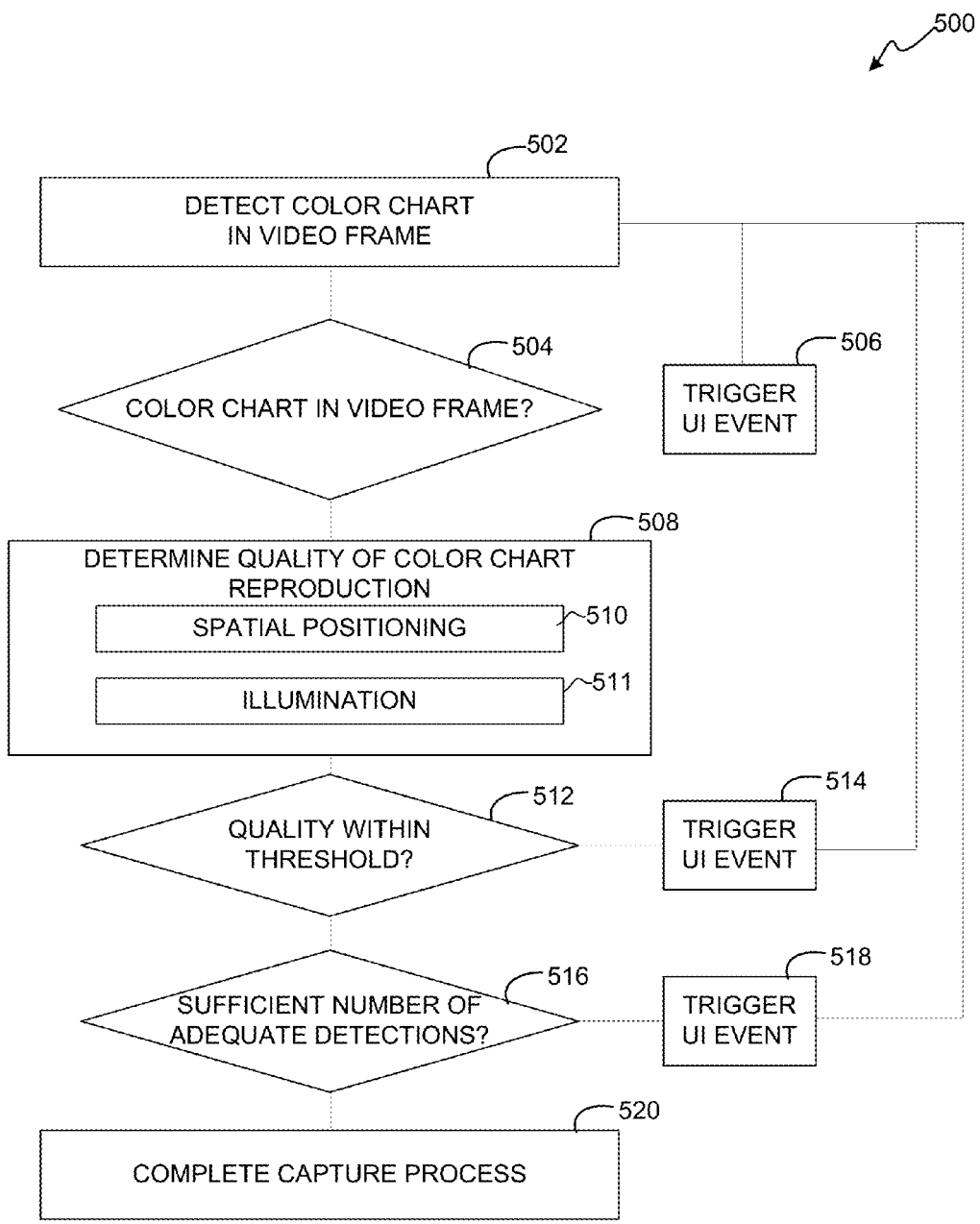
FIG. 5 is a flowchart for implementing methods to dynamically guide the user to make adjustments in a video acquisition according to examples herein.
Figure 6:
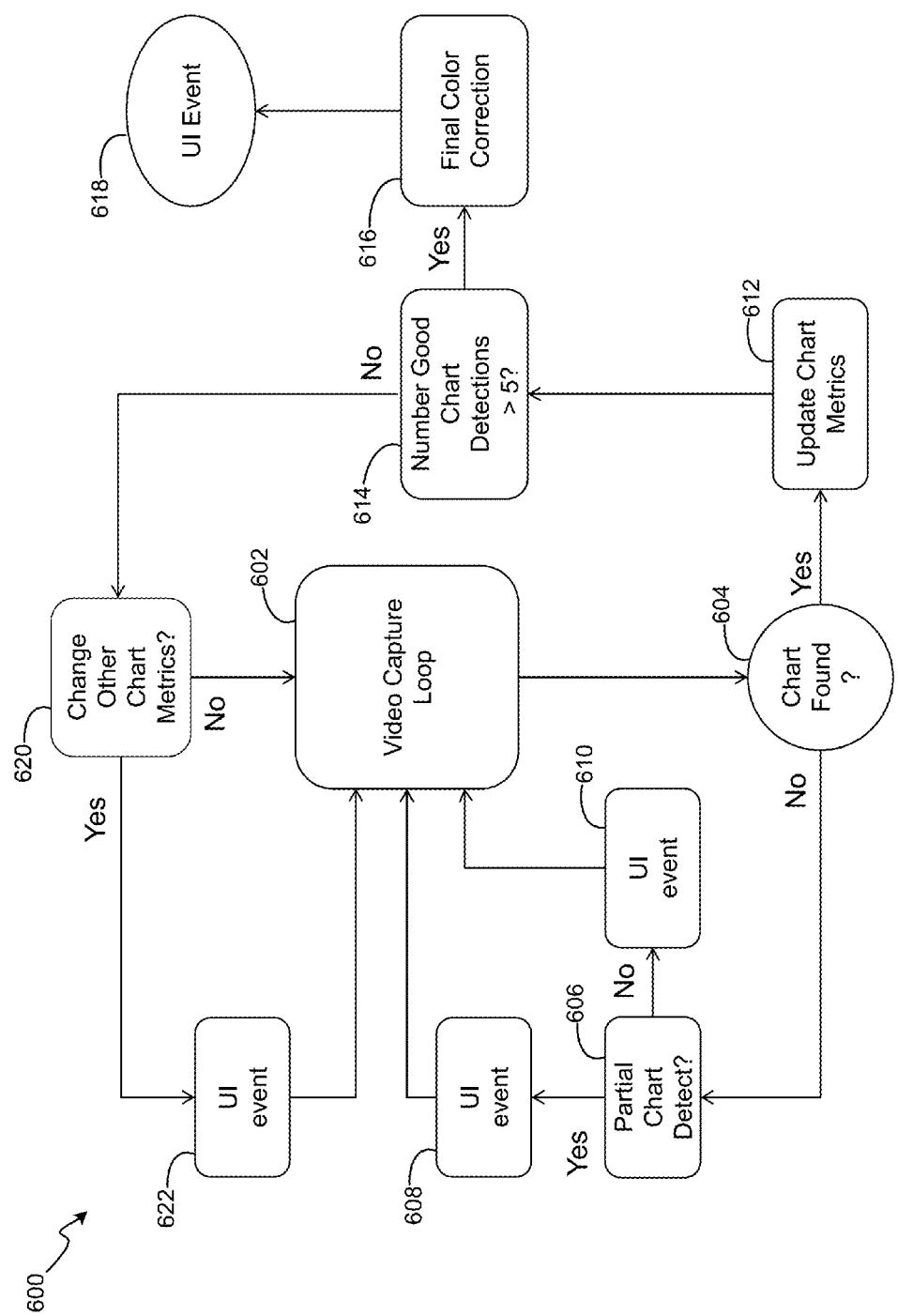
FIG. 6 is a flowchart for implementing methods to operate an imaging device.

FIGS. 4 to 6 are exemplary flow diagrams to implement examples herein. In discussing FIGS. 4 to 6, reference is made to the diagrams in FIGS. 1 to 3 to provide contextual examples. Implementation, however, is not limited to those examples. Reference is also made to the example depicted in FIG. 7. Again, such references are made simply to provide contextual examples.

FIG. 4 illustrates a flowchart 400 for implementing methods to guide a user acquiring a reproduction of a color calibration chart according to examples herein. The method of flowchart 400 may be implemented at mobile imaging device 104 or any other suitable imaging device. At least some of the blocks of flowchart 400 might be executed by a processor in mobile imaging device 104 or any other suitable imaging device.

At block 402, frames of a video acquired via camera 112 at mobile imaging device 104 are processed in real-time. Real-time processing may include accessing a stream of continuous successive images being acquired via camera 112 and making them available for the further processing described herein. As used herein, real-time denotes that the processing of video frames is performed as rapidly as required, or possible, for guiding the user in the acquisition of a color chart and, more specifically, as rapidly as necessitated by the further blocks in flow chart 400. It will be understood that real-time may include some time delays caused by computational constraints or dedicated computational selected at the system executing process flow 400 (e.g., mobile imaging device 104). The real-time processing of video frames for performing blocks in process flow 400 enhances user experience for obtaining an appropriate capture of a color chart.

The processing at block 104 may include automatically detecting whether a video frame includes a reproduction of color chart 110. Examples of automatic detection of a color chart are illustrated below with respect to FIG. 5. Video acquisition engine 202 (shown in FIG. 2) may be responsible to implement block 402.

At block 404, upon frames of the video including a reproduction of the color calibration chart, user feedback is displayed to dynamically guide the user to make adjustments in the video acquisition. The dynamic guiding is performed so as to capture a color calibration chart reproduction within a selected quality threshold. As used herein, dynamic guiding refers to using real-time data acquired via camera 112 to give a real-time feedback to the user in order to facilitate a proper capture of the color chart. Generally, the selected quality threshold is selected so that the color chart capture is suitable to perform color profiling with a specific accuracy.

Dynamic guiding at block 404 may include determining quality of color chart acquisition, checking whether color chart quality is within the selected quality threshold and, based on the determination, accordingly generate a feedback. Color chart quality determination is set forth below with respect to FIG. 5.

Some examples on user feedback have been already illustrated above with respect to FIG. 1. More specifically, user feedback might include graphical, textual, or acoustical UI events (e.g. smiley 118 or text interface 120) that dynamically prompt the user to make adjustment in the video acquisition so as to facilitate capture of a color chart reproduction appropriate for color profiling. Other UI events for guiding user during color chart acquisition are foreseen. For example, an acquisition quality meter may be displayed that informs the user in real-time on quality of a color chart acquisition.

For example, UI events may be provided that prompt the user to spatially adjust the video acquisition. For example, a frame overlay may be displayed that indicate to the user that the imaging device should be placed such that the real-time image of the color chart is placed within the frame. A text image may be displayed indicating to the user that the color chart image should be positioned within the frame. Alternatively, or in addition thereto, UI events may be displayed that indicate to the user in which direction the mobile device is to be displaced in order to correctly adjust the video acquisition. Such UI events may be delivered via a text interface (e.g. a text interface displaying "move left," "move right," or "avoid casting shadow") or graphical elements (e.g., arrows indicating in which direction imaging device 104 should be moved).

If the used imaging device is provided with a haptic interface, haptic feedback may be provided that indicates to the user how to adjust the video acquisition. For example, mobile device 104 may vibrate towards the side along which the device should be displaced for realizing a convenient video adjustment for adequate color chart capturing.

Alternatively, or in addition to spatial UI events, device 104 may render UI events indicative on capture quality. For example, graphic elements such as smiley 118 or overlay 122 may indicate to the user that the capture has been, or not, performed with the required quality. Other UI elements may include a graph bar that indicates quality of the capture. The graph bar value may be based on quality of a single acquisition or of multiple acquisitions. Regarding the latter, capture of a color chart reproduction may be performed based on an average of the multiple acquisitions. The graph bar value may then indicate progress of the average so that the user obtains a feedback on the number of acquisition still required for completing suitable capture of the color chart. Such averaging feedback may also be performed by displaying the number of color chart acquisitions averaged for the capture and/or the number of color chart acquisitions that are still to be averaged for completing the capture.

In some examples, acoustical UI events may be triggered. For example, a voice interface may indicate to the user quality of the acquisition. In other example, a beep interface may indicate using a varying beep frequency quality of the acquisition. A low frequency may be indicative of a low acquisition quality. A higher frequency may be indicative of a higher acquisition quality. A continuous tone may be indicative of a completed capture of a color chart.

Alternatively, or in addition to spatial and/or quality UI events, device 104 may render UI events indicative on the reason as to why capture quality is not within a selected quality threshold (e.g., capture quality is not sufficient for accurate color profiling). Such UI events guide the user to overcome problems impairing color chart capture. An example of such UI event is text interface 120 shown in FIG. 1. Such a text interface displays a corresponding text string when illumination on color chart 110 is not adequate, e.g., because illumination across color chart 110 is not uniform due to a shadow cast over it. Other examples are text or voice interfaces indicating that color chart acquisition is not being performed with a correct position (e.g., acquisition is too oblique, too far, or too close).

It will be understood that the examples of UI events above are merely illustrative and do not limit the scope of the present disclosure. Other UI events for dynamically guiding the user to make adjustments in the video acquisition are foreseen such as, but not limited to, audio sounds or voice messages that guide the user to make specific adjustments or non-uniform illumination areas at the display that very depending on the acquisition quality. For example, illumination intensity bars can be displayed surrounding a sampling area or other area, e.g., around an overlay frame as described above. In an example, a maximum of nine or more intensity bars are displayed for indicating that capture with a selected quality threshold has been performed.

From the above, it will be understood that multiple types of UI event may be combined for enhancing user experience in color chart capturing.

At block 406 it is checked whether a color calibration chart reproduction is captured within a selected quality threshold. (Color chart quality determination is set forth below with respect to FIG. 5.) If capture quality is not within the selected quality threshold, flow chart 400 goes to block 404 so that further feedback is provided to the user for guiding the user to acquire color chart 110.

If capture quality is within the quality threshold, flow chart 400 may go to block 408 in which the user is signaled that quality was acceptable and color chart capture could be performed. Further, once a color chart with a sufficient quality is captured, further processing based on the color chart may be performed. For example, color profiling based on the captured color chart may be performed as described herein.

FIG. 5 illustrates a flowchart 500 for implementing methods to dynamically guide the user to make adjustments in the video acquisition so as to capture a color calibration chart reproduction within a selected quality threshold according to examples herein. The method of flowchart 500 may be implemented at mobile imaging device 104. At least some of the blocks of flowchart 500 might be executed by a processor in an imaging device (e.g., mobile imaging device 104).

At block 502, it is automatically detected whether a processed video frame contains a reproduction of color chart 110. There are a variety of manners for automatically detecting a color chart reproduction. For example, a color chart may be automatically detected by identifying pre-defined differences between the standardized colors of the color chart and a color chart background. Alternatively, or in addition thereto, a chart substrate containing the color chart may be provided with an encoding element (e.g., a QR code, not shown) that can be read to automatically detect that a video frame contains a color chart reproduction. Alternatively, or in addition thereto, a color chart may be automatically detected by identifying specific areas of the color chart, such as the specific areas illustrated below with respect to FIG. 7.

For example, video frames may be processed to recognize a specific set of points corresponding to a pre-determined pattern that characterizes the chart substrate containing the color chart. For example, referring to FIG. 7 (more specific details on this Figure are set forth below), corners 710a-710d may be used to recognize color chart 700. Corners 710a-710d are characterized in being corners within two adjacent frames of known color, e.g., cyan and yellow. Any other pre-determining pattern characterizing a color chart, or the chart substrate, can be used for the color chart detection, such as borders of preselected colors (e.g., sub-frames 702a, 702b of color chart 700). For example, identified frame corners 710a-710d may be used to locate color patches based on their relative known position from the frame corners. In other examples, boundaries between known colors can be used to detect frames or borders around color charts that are not rectangular and have corners Referring back to FIG. 5, at block 504, it is checked whether the processed video frame contains a reproduction of color chart 110. (For example, referring to FIG. 1, video frames 106a and 106b do not contain a complete reproduction of color chart 110 while video frames 106c and 106d contain a complete reproduction of color chart 110). If it is determined that a color chart is not detected in a video frame, a corresponding UI event may be triggered at block 506 for accordingly informing the user and flow chart 500 may then go to block 502. If it is determined that a color chart is detected in the video frame, flow chart 500 may then go to block 508 (a corresponding UI event, block not shown, may be triggered for accordingly informing the user). In some examples, it may be determined that a video frame only contains a portion of a color chart and a corresponding UI event may be triggered for accordingly informing the user.

At block 508, quality of the color chart reproduction is determined. It will be understood that determining color chart reproduction quality may be performed by a number of different procedures. For determining quality, a quality metric may be computed based on the different quality parameters described herein. In the illustrated example, quality is determined based on the spatial location and illumination of the detected color chart reproduction. The quality parameter may be computed as dependent on both color chart spatial location and illumination. Alternatively, or in addition thereto, other quality parameters may be taken into account for the determination at block 508. Further, the quality determination at block 508 must not necessarily imply multiple quality parameters (e.g., spatial location and illumination) but may be based on a single parameter.

The determination at block 508 may include a sub-block 510 of determining spatial positioning of the color chart reproduction. There are a variety of possibilities for determining quality based on the spatial positioning of the color chart reproduction.

In an example, determining spatial positioning may include determining spatial positioning of the color chart reproduction relative to an overlay frame displayed in the display. Such an overlay frame indicates to the user where the color chart reproduction is to be placed. Such an overlay frame may correspond to the physical shape of the color chart (for example, a rectangular overlay frame corresponding to a rectangular outer boundary of the color chart). In other examples, the overlay frame may be distorted to force an angled acquisition of the color chart, thereby preventing that the user cast shadows over the color chart. For example, a trapezoidal overlay frame may be displayed to guide the user to dispose imaging device 104 at an angle such that a rectangular color chart fits in the trapezoidal frame.

For estimating spatial quality, the location of the color chart relative to the overlay frame may be computed. Such computing may be performed by selecting one or more reference points at the color chart reproduction (e.g., a central point, a corner, or any other location at the color chart) and computing its distance (e.g., in pixel or dimensional units, or any other suitable unit) to one or more reference points at the overly frame (e.g., a central point, a corner, or any other location at the overlay frame.).

From this computation, it can be determined whether the color chart is within the overlay frame. If it is determined that the color chart is not within the overlay frame, then a distance quality metric may be updated based on the distance of the overlay frame from the overlay frame: the lower the distance, the higher the distance quality metric is, and vice versa. If an acquisition quality meter is being displayed, then it might be updated using the computed quality meter. In some examples, it might be required that the color chart must be located within the overlay frame for using its reproduction for capture. In such cases, an UI event may be triggered for indicating the user that the color chart is to be placed within the overlay frame. In other examples, for being used for color chart capture, a color chart reproduction must not necessarily be contained within the overlay frame but close enough. In such cases, the distance quality metric may be used for determining whether the color chart is close enough.

Next, the distance quality metric may be updated based on how close the color chart reproduction matches the overlay frame. How close the color chart reproduction matches the overlay frame is indicative of the relative distance between the imaging device and the color chart as well as the relative angles between the imaging device and the plane of the color chart. To compute matching between the chart and frame, size of the color chart relative to the overlay frame might be computed: the closer the size of the color chart to the size of the overlay frame, the higher the matching is. Further, relative angles between corresponding sides of the color chart and the overlay frame might also be determined for computing the matching: the higher the relative angles, the lower the matching is. Once the matching is determined, it can be used to further compute the distance quality metric: the higher the matching, the higher the distance quality metric is. If it is determined that the matching is not enough (for example, size of color chart reproduction is below 75% of the overlay frame size), then an UI event may be triggered to indicate to the user how to place the imaging device, e.g. that the imaging device should be placed closer to the color chart.

Next, it might be assessed whether the computed distance quality metric is good enough (e.g., it is within a selected threshold) for using the color chart acquisition for capture. If this is not the case, the process may be restarted by proceeding to detect a color chart in the next video frame to be analyzed.

It will be understood that an overlay frame is not strictly required for assessing quality of spatial positioning. For examples, video acquisition parameters can be used to determine the spatial location of the color chart. Such video acquisition parameters may include focus distance, display parameters, or relative position of the color chart within the boundaries of the display device.

In the illustrated example of FIG. 5, at block 511, illumination of the color chart is taken into account in the quality determination of block 508. Block 511 may be performed once it is determined at block 510 that spatial positioning of the color chart is good enough. In other examples, illumination may be firstly assessed and subsequently, if required, positioning may be assessed.

Figure 7:
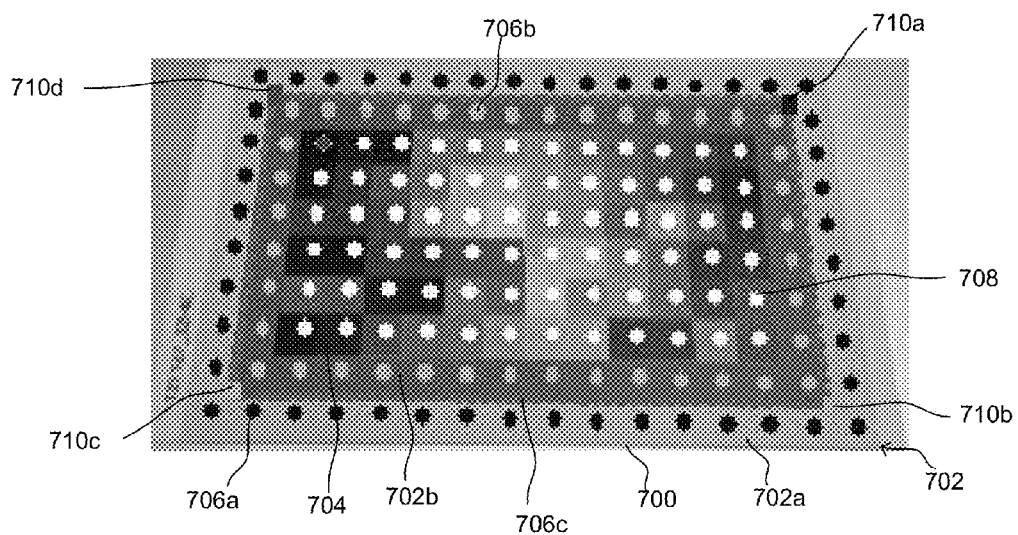
FIG. 7 is a schematic representation of a color chart and measurement points thereon according to examples.

For illustrating how illumination may be taken into account for the quality determination of block 508, reference is made to FIG. 7. FIG. 7 depicts a color chart reproduction 700. Color chart 700 includes a background area 702 adjacent to color patches 704. In the illustrated example, background area 702 is a frame comprised of two sub-frames 702a, 702b. Each of two sub-frames 702a, 702b is colored differently, for example yellow and cyan, respectively.

Illumination between selected spots of the color chart reproduction may be compared. More specifically, multiple measurement of a specific optical property such as color, relative illumination level, RGB levels or combinations thereof over a color chart may be performed for assessing illumination over the color chart.

The selected spots may be of a background area adjacent to color patches of the color chart. Different options for selecting the spots are illustrated in the following. In an example, the selected spots are at a uniform color zone of the background area. More specifically, the uniform color zone may be a uniformly colored frame surrounding color patches of the color chart, such as sub-frames 702a, 702b. In FIG. 7, potential candidates for selecting spots to measure illumination are depicted. In particular, a first set of spots 706a is illustrated on sub-frame 704b and a second set of spots 706b is illustrated on sub-frame 704b. For determining lightning condition, the specific optical property mentioned above may be measured for each spot in a spots set; differences in the measurement values between spots in the same set are then indicative of illumination variances over color chart 700. Multiple spot sets may be used for providing redundancy in the determination.

Alternatively, or in addition to measuring on uniform color zones, the selected spots may be at an interface between different color zones of the background area. In that case, the measurement may be a contrast measurement between the different color zones. Contrast variations are then indicative of illumination variances over the color chart. Such selected spots are also depicted in FIG. 11. In particular, spots 706c are indicated at the interface between sub-frames 706a and 706b.

It will be understood that there are a variety of manners of selecting spots for performing the brightness comparison. For example, as an alternative to use of selected spots at a background area, the selected spots may correspond to separated color patches of the same color. More specifically, a color chart may contain two or more patches of the same color, the patches being distributed spatially across the chart. Color and/or brightness of these patches may be measured and then compared to each other to determine measurement consistency, and hence illumination, across the chart.

The difference in illumination as assessed from the measurements set forth above may be used to compute an illumination quality parameter: the higher the illumination difference, the lower the illumination quality parameter is. More specifically, the variation or consistency of the measurements at the selected spots may be computed in any suitable unit and the illumination quality parameter may be computed as a function thereof. Thereby, an illumination quality metric can be computed that increases proportional to color chart illumination uniformity.

In the illustrated example, at block 511, it might be assessed whether illumination quality is good enough for using a color chart acquisition for capture. More specifically, it may be determined the following: (i) illumination of the detected color calibration chart; and (ii) whether illumination is appropriate for performing color profiling based on the color chart reproduction.

In the following it is described how quality can be assessed based on color chart illumination. For example, if an illumination quality metric is above a selected threshold, then it may be determined that illumination is acceptable for using the color chart reproduction for capture. In other words, if the difference in illumination across the chart is sufficiently low, the acquired color chart may be usable for color profiling. If it is determined that illumination is not good enough, an UI event may be triggered for informing the user that illumination is not appropriate. For example, a text message might be outputted indicating to the user not to cast shadows over the color chart. Further, actions might be taken for improving illumination, such as activating a flash of the imaging device.

As set forth above, depending on the determined quality, different actions may be triggered. As illustrated by block 512, if quality is below a selected threshold, a UI event might be triggered at block 514 for accordingly informing the user and facilitating guiding for color char acquisition. If quality is above a selected threshold, then the color chart reproduction may be used for capture. Further, as illustrated by block 516, if a required number of adequate color chart reproductions have not been yet acquired, then an UI event may be triggered at block 518 for informing the user that the acquisition process should be further performed. Once, the required number of adequate color chart reproductions is acquired, then the capture process can be completed at block 520.

In the following, a pseudo-code illustrating an example based on the quality determination illustrated above is set forth. It will be understood that the following example is merely illustrative and does not limit how quality can be determined in flow chart 500.

---

COMPUTE DISTANCE (COLOR CHART, OVERLAY FRAME)
IF COLOR CHART NOT WITHIN OVERLAY THEN
    COMPUTE DISTANCE QUALITY METRIC AS DECREASING
    INVERSELY PROPORTIONAL TO DISTANCE
    UPDATE ACQUISITION QUALITY METER
    TRIGGER UI EVENT FOR INDICATING CHART IS TO BE
    PLACED WITHIN FRAME
IF COLOR CHART WITHIN OVERLAY THEN
    COMPUTE MATCHING BETWEEN CHART AND FRAME
    COMPUTE DISTANCE QUALITY METRIC AS INCREASING
    PROPORTIONAL TO MATCHING
    UPDATE ACQUISITION QUALITY METER
IF DISTANCE QUALITY METRIC > DISTANCE QUALITY
THRESHOLD THEN
    DETERMINE ILLUMINATION ACROSS COLOR CHART
    COMPUTE ILLUMINATION QUALITY METRIC AS
    INCREASING PROPORTIONAL TO ILLUMINATION
    UNIFORMITY
    IF DISTANCE QUALITY METRIC > DISTANCE QUALITY
    THRESHOLD THEN
        USE COLOR REPRODUCTION FOR COLOR CHART
        CAPTURE
        INCREASE VALID ACQUISITION COUNT
            IF VALID ACQUISITION COUNT = TOTAL
            REQUIRED COUNT THEN FINISH CAPTURE

---

FIG. 6 shows a flowchart 600 for implementing methods to operate an imaging device (e.g., mobile imaging device 104)

according to examples herein. Flowchart 600 more specifically illustrates some of the principles for color chart acquisition described above.

Flowchart 600 is performed based on a video acquisition loop 602, during which a video is acquired via camera 112 as described herein. At block 604, it is assessed whether a color chart reproduction is included in video frames from video acquisition loop 602.

If a color chart is not detected, at block 606 it might be assessed whether only a portion of the color chart is being acquired. If block 606 determines that the color chart is being only partially acquired, an UI event 608 might be triggered for accordingly guide the user to completely acquire the color chart and flowchart 600 may go on with loop 602. If block 606 determines that the color chart is not at all being acquired, an UI event 610 might be triggered for informing the user that no color chart is being detected.

If a color chart is detected at block 604, at block 612 metrics related to the color chart capture process may be update by performing the different determinations set forth above. For example, different checks can be made to assess quality of the color chart reproduction such as chart location in the image, chart size in the image, or appropriate illumination of the color chart. If the quality assessment has a positive result, the color chart acquisition may be further processed for being used in the color chart capture to be used for color profiling.

Once a "good" color chart reproduction is detected, at block 614 it is determined whether a selected number of detected color chart calibration reproductions adequate for the capture have been processed. If this selected number has been reached, then the capture may be processed for color profiling at block 616 and a corresponding UI event 618 may be triggered for informing the user that the color chart has been captured appropriately. In some examples, the color chart capture is an average over the selected number of detected color chart calibration reproductions. For examples, from each "good" color calibration acquisition, measured colors can be extracted for each color patch, and a color for each color patch can be captured as an average over all the measured color patches. In an example, three "good" color chart acquisitions, each with a number of color patches (e.g., 72), are detected and then color patch measurements are averaged in each color patch over the three "good" acquisitions to obtain a mean and standard deviation for each of the color patches. In other examples, the color chart capture corresponds to the color chart calibration reproduction with the highest reproduction quality.

If at block 614 it is determined that further "good" chart detections are still required, then it might be determined at block 620 whether some specific quality metrics need to be improved for realizing color chart capture. For example, the spatial positioning may be acceptable, but illumination is to be improved for accelerating the capture. If specific quality metrics are required, then UI event 622 may be triggered for guiding the user to adjust acquisition so as to improve the required quality metrics. Thereafter, video loop 602 is further processed following similar guidelines.

Flow chart 600, as well as at least some of the other examples herein, is aimed to improve user experience in the acquisition of color charts by providing a simple and easy interface which automatically detects a color chart in a video stream and alert a user to improve capture performance. Moreover, the interface facilitates improving image capture by processing one or more "good" color chart acquisitions.

It will be appreciated that examples above can be realized in the form of hardware, programming or a combination of hardware and the software engine. Any such software engine, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a tangible computer-readable storage medium that are suitable for storing a program or programs that, when executed, for example by a processor, implement embodiments. Accordingly, embodiments provide a program comprising code for implementing a system or method as claimed in any preceding claim and a tangible or intangible computer readable storage medium storing such a program. A tangible computer-readable storage medium is a tangible article of manufacture that stores data. (It is noted that a transient electric or electromagnetic signal does not fit within the former definition of a tangible computer-readable storage medium.)

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, at least the terms "include" and "comprise" are used as open-ended transitions.

What is claimed is:

1. A method comprising:
    at a imaging device including a camera for acquiring a video and a display to display the video, the video of a physical color calibration chart physically located near a physical object within a scene, the color calibration chart adapted to permit identification of a color of interest of the object so long as the color calibration chart is within a selected quality threshold in the video;
    processing in real-time frames of the video;
    upon frames of the video including the color calibration chart, displaying user feedback to dynamically guide the user to make adjustments in the video acquisition so as to capture the color calibration chart within a selected quality threshold; and
    upon capturing the color calibration chart within the selected quality threshold, signaling that the color calibration chart has been sufficiently captured so that the identification of the color of interest of the object within the video is able to be determined,
    wherein if the color calibration chart is failed to be captured within the selected quality threshold, the identification of the color of interest of the object within the video is unable to be determined.

2. The method of claim 1, wherein dynamically guiding the user to make adjustments in the video acquisition includes signaling the user to adjust the relative position between the color chart and the imaging device.

3. The method of claim 1, wherein dynamically guiding the user to make adjustments in the video acquisition includes displaying in the display an overlay frame into which a video image of the color calibration chart is to be placed.

4. The method of claim 1, wherein dynamically guiding the user to make adjustments in the video acquisition includes signaling the user to avoid casting a shadow on the color calibration chart.

5. A computer software product comprising a non-transitory tangible medium readable by a processor, the medium having stored thereon a set of instructions for obtain a reproduction of a color calibration chart, comprising:
- a set of instructions which, when loaded into a memory and executed by the processor, causes processing a video acquired by an imaging device, the video of a physical color calibration chart physically located near a physical object within a scene, the color calibration chart adapted to permit identification of a color of interest of the object so long as the color calibration chart is within a selected quality threshold in the video;
- a set of instructions which, when loaded into a memory and executed by the processor, causes analyzing the video to automatically detect the color calibration chart within one or more first frames of the video;
- a set of instructions which, when loaded into a memory and executed by the processor, causes, upon detection of the color calibration chart, determining whether color calibration chart reproduction quality is within the selected quality threshold so that the identification of the color of interest of the object within the video is able to be determined; and
- a set of instructions which, when loaded into a memory and executed by the processor, causes, upon determining that color calibration chart reproduction quality is not within the selected threshold, providing user feedback, via the imaging device, to dynamically guide the user to make adjustments in the video acquisition in order to obtain the color calibration within the selected quality threshold,
- wherein if the color calibration chart is failed to be captured within the selected quality threshold, the identification of the color of interest of the object within the video is unable to be determined.

6. The product of claim 5, wherein determining quality includes determining spatial positioning of the color chart reproduction.

7. The product of claim 6, wherein determining spatial positioning includes determining spatial positioning of the color chart reproduction relative to an overlay frame displayed in the display.

8. The product of claim 5, wherein determining whether color calibration chart reproduction quality is within a selected quality threshold includes
- determining illumination of the detected color calibration chart, and
- determining whether the illumination is appropriate for performing color profiling based on the color chart reproduction.

9. The product of claim 8, wherein determining whether color calibration chart reproduction quality is within a selected threshold includes determining whether the difference in illumination across the chart is within a selected threshold.

10. The product of claim 5, further comprising performing a color chart capture based on a selected number of detected color calibration reproductions for which reproduction quality is within the selected quality threshold.

11. The product of claim 10, a set of instructions which, when loaded into a memory and executed by the processor, the color chart capture is an average over the selected number of detected color chart calibration reproductions.

12. The product of claim 10, a set of instructions which, when loaded into a memory and executed by the processor, the color chart capture corresponds to the color chart calibration reproduction with the highest reproduction quality.

13. An imaging device, comprising:
- a camera;
- a display;
- a video acquisition engine to acquire a video via the camera of a physical color calibration chart physically located near a physical object within a scene, the color calibration chart adapted to permit identification of a color of interest of the object so long as the color calibration chart is within a selected quality threshold in the video;
- a video rendering engine to display a video stream based on the video acquired via the camera; and
- a chart capture engine to automatically capture the color calibration chart from the video acquired via the display, the chart capture engine continuously processing the video to:
  - automatically detect the color calibration chart in a first frame of the video;
  - upon detecting the color calibration chart, determining whether the color calibration chart is within the selected quality threshold so that the identification of the color of interest of the object within the video is able to be determined; and
  - upon determining that the color calibration chart reproduction is outside the selected quality threshold, guide a user to make adjustments in the video acquisition engine, detect the color calibration chart in a second frame of the video acquired after the user has made the adjustments, and determine whether the color calibration chart reproduction is now within the selected quality threshold,
- wherein if the color calibration chart is failed to be captured within the selected quality threshold, the identification of the color of interest of the object within the video is unable to be determined.

14. The device of claim 13, further comprising a guiding engine to provide user feedback on quality of detected color calibration chart reproductions.

15. The device of claim 13 implemented at a mobile computing device.

\* \* \* \* \*

UNITED STATES PATENT AND TRADEMARK OFFICE
CERTIFICATE OF CORRECTION

| | | |
|---|---|---|
| PATENT NO. | : 8,872,923 B2 | Page 1 of 1 |
| APPLICATION NO. | : 13/772294 | |
| DATED | : October 28, 2014 | |
| INVENTOR(S) | : Melanie M. Gottwals et al. | |

It is certified that error appears in the above-identified patent and that said Letters Patent is hereby corrected as shown below:

Title Page, Item (71), Applicant, in column 1, line 2, delete "LLP," and insert -- L.P., --, therefor.

In the Claims

In column 17, line 11, in Claim 5, delete "instructions for" and insert -- instructions to --, therefor.

Signed and Sealed this
Nineteenth Day of May, 2015

Michelle K. Lee
*Director of the United States Patent and Trademark Office*